April 17, 1962  W. C. PILKINGTON, JR., ET AL  3,030,049
SATELLITE SPIN CONTROL
Filed Dec. 11, 1959  4 Sheets-Sheet 1

William C. Pilkington, Jr.
William S. McDonald
Willard H. Wells,
INVENTORS.

BY S. J. Rotondi,
A. T. Dupont, and
Alvin E. Moore,
ATTORNEYS.

William C. Pilkington, Jr.
William S. McDonald
Willard H. Wells,
INVENTORS.

April 17, 1962 W. C. PILKINGTON, JR., ET AL 3,030,049
SATELLITE SPIN CONTROL
Filed Dec. 11, 1959 4 Sheets-Sheet 4

William C. Pilkington, Jr.
William S. McDonald
Willard H. Wells,
INVENTORS.
BY S. J. Rotondi,
A. T. Dupont, and
Alvin E. Moore,
ATTORNEYS.

United States Patent Office 3,030,049
Patented Apr. 17, 1962

3,030,049
SATELLITE SPIN CONTROL
William C. Pilkington, Jr., Tujunga, and William S. McDonald and Willard H. Wells, Pasadena, Calif., assignors, by mesne assignments, to the United States of America as represented by the Secretary of the Army
Filed Dec. 11, 1959, Ser. No. 859,079
9 Claims. (Cl. 244—1)

This invention relates to a means for controlling the spin of a satellite or other space vehicle that moves over a course outside the atmosphere. After separation from the final-stage propulsive part of its rocket assembly such a vehicle is rotated at a speed sufficiently high to gyrostabilize its longitudinal axis. In the beginning of the nose cone's free flight this rotary speed is relatively large. But later it is frequently necessary to reduce this speed to a small value, for a certain degree of gyrostabilization, sufficient to stabilize the vehicle under nearly shockless conditions in space, but not enough to interfere with control of the vehicle's attitude or with desired scanning of the earth or the moon. In the 1958 flight of the Pioneer III, for instance, the rotary speed of the nose cone after its separation was at first 400 r.p.m.; but later, by means of a species of the present invention, this speed was reduced, without necessity of the weight handicap of control-jet fuel, to 5½ r.p.m. At times it is desirable, for example in securing very accurate attitude control, to completely stop the satellite's initial spin and then to give it a small, exact rotary speed. At other times, as in scanning of the earth or another planet or the moon, such a complete, but momentary, stop is needed as a phase in a repeated cycle of rotation.

In view of these facts, an object of this invention is to provide a spinning satellite or other space vehicle that has an inertial means for control of its rotary speed.

Another object of the invention is to provide a rotary space vehicle having inertial means for reducing its spin to zero and jet means for giving it a small, exact rotary speed.

A further object of the invention is to provide a rotary space vehicle having a cycle of rotation that includes a momentary, periodic stop in its rotation.

The foregoing and other objects will become more fully apparent from the following detailed description of exemplary structure embodying the invention and from the accompanying drawings, in which:

FIGURE 1 shows a form of the invention in which the rotation of a spinning satellite or other space vehicle may be reduced either to a small value or to zero.

In its preferred form, the satellite comprises the nose-cone portion of a multi-stage space vehicle, and the body 1 of this portion has been given a gyrostabilizing spin of several hundred r.p.m. As the satellite moves farther out in space, it is subject to fewer attitude-disturbing forces, probably receiving only the slight torques of spatial electric forces or occasional meteors. Therefore, after a certain distance or time of travel a conventional integrating accelerometer, computer or timing device sends an electric signal that cause pyrotechnic bolts 2 (FIGURE 4A or 4B) to be exploded. This releases weight 3 and wire 4 for unwinding in the direction of the satellite's spin.

Figure 4B:
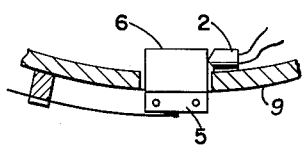
FIGURES 4A and 4B are sectional views of alternative means for fastening the weights to the shell of the vehicle.
Figure 4A:
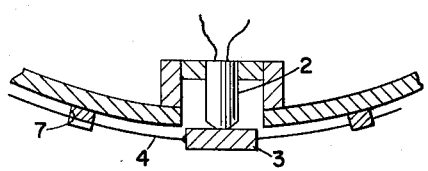

FIGURES 4A and 4B show alternative types of weights and their fastening means. In FIGURE 4A weight 3, which may be of steel or other metal of high tensile strength, is directly fastened to wire 4 (as by welding). The weight is held on the shell by explosive bolt 2. In FIGURE 4B weight 5 is fastened by rivets or bolts to steel plate 6; and the plate is fastened to the wire at one end and to the pyrotechnic bolt 2 at its other end.

Figure 6:
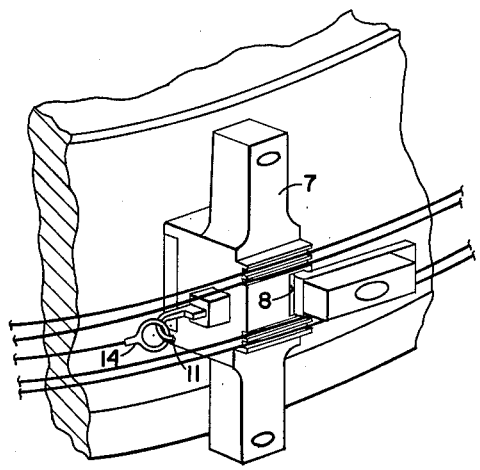
FIGURE 6 is a perspective view of an alternative wire-fastening means.

In the alternative set of wire-fastening means shown in FIGURE 6, the hook and the weight-supporting plate are shown as oppositely fastened to the sides of one of the wire-supporting brackets 7. In this particular bracket, which is hollow, certain ones of the wire-retaining recesses are spaced farther apart than are the recesses in the other brackets, to allow sufficient space for the slot 8 in the metal face of the bracket. Thru this slot part of the plate projects. On the inside of the shell a pyrotechnic bolt for temporarily holding the plate in the slot is located.

Figure 3:
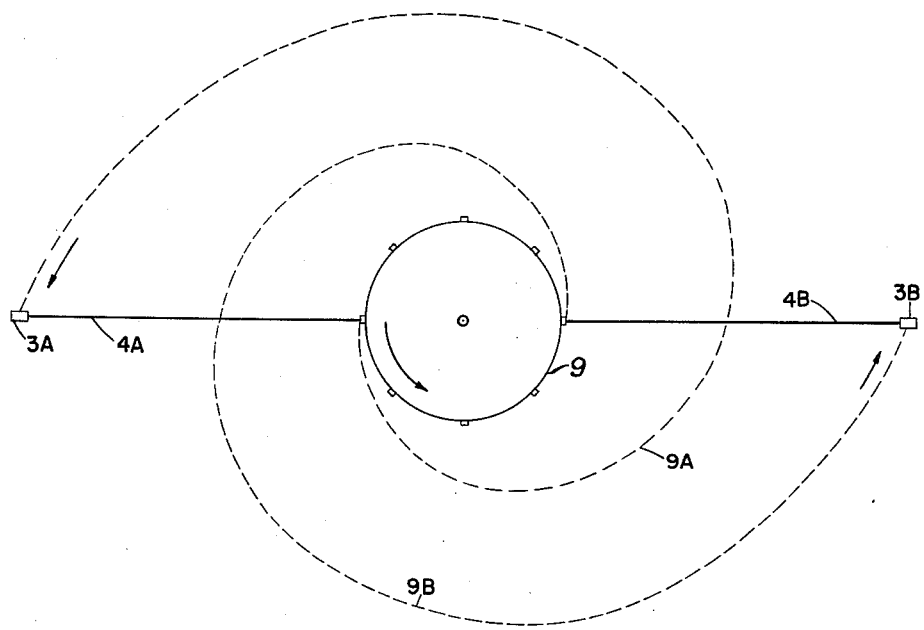
FIGURE 3 is a plan view on a reduced scale of the structure of FIGURE 2.

The tiny explosion of the bolt releases the weight and one end of the wire. The weight then moves outward under centrifugal force and the attached wire begins to unwind from around the satellite shell, so that the weight moves in a spiral path, indicated at 9 (9A or 9B) in FIGURE 3.

Figure 7:
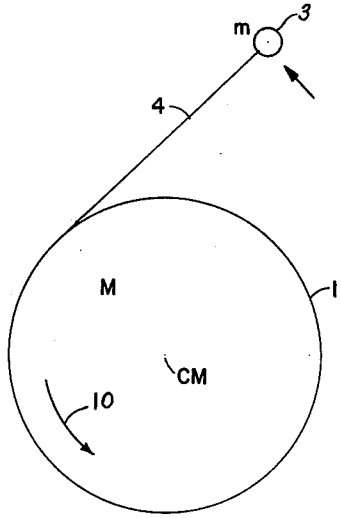
FIGURE 7 is a diagram illustrating the basic principle that is incorporated in the structure.

In this unwinding, illustrated schematically in FIGURE 7, wire 4 leads the weight, due to the fact that the wire is so wound relative to the direction 10 in which the satellite is spinning that weight 3 places a tension on the wire and this tension in combination with centrifugal force causes the weight and wire to unwind in the direction 10.

This relative movement of the little mass $m$ of weight 3 and the large mass $M$ of the main rotating body 1 takes place within the rotating system as a whole, and thus affects the specific angular momentums of the two masses. Before weight 3 was released for this unwinding movement the angular momentum of the entire system depended on the combined masses times the radius of rotation of the center of their combined mass times their unitary velocity. But after release of weight 3 the total angular momentum of the system as a whole, which remains substantially constant in space, depends on two varying factors: (1) the product of the mass $M$, its radius and its speed; (2) the product of the mass $m$ and its radius and speed. Since the sum of these two elements remains constant, and both of the rotating masses and the radius of rotation of one of the masses ($M$) also remain constant, it is apparent that as the radius of the small mass $m$ increases in its unwinding motion, the velocity of the large mass $M$ decreases. This progressive slowing of mass $M$ (that is, of the satellite body 1) is accentuated due to the other changing element of factor (2) that comprises mass $m$, namely, its angular velocity. This velocity increases as the wire unwinds because of the fact that the wire leads weight 3.

With the proper selection of the mass $m$ and of the length (number of turns of the wire), the rotary speed of mass $M$ can be quickly reduced to a small value, or to zero, or even to a negative or reverse angular velocity.

Figure 1:
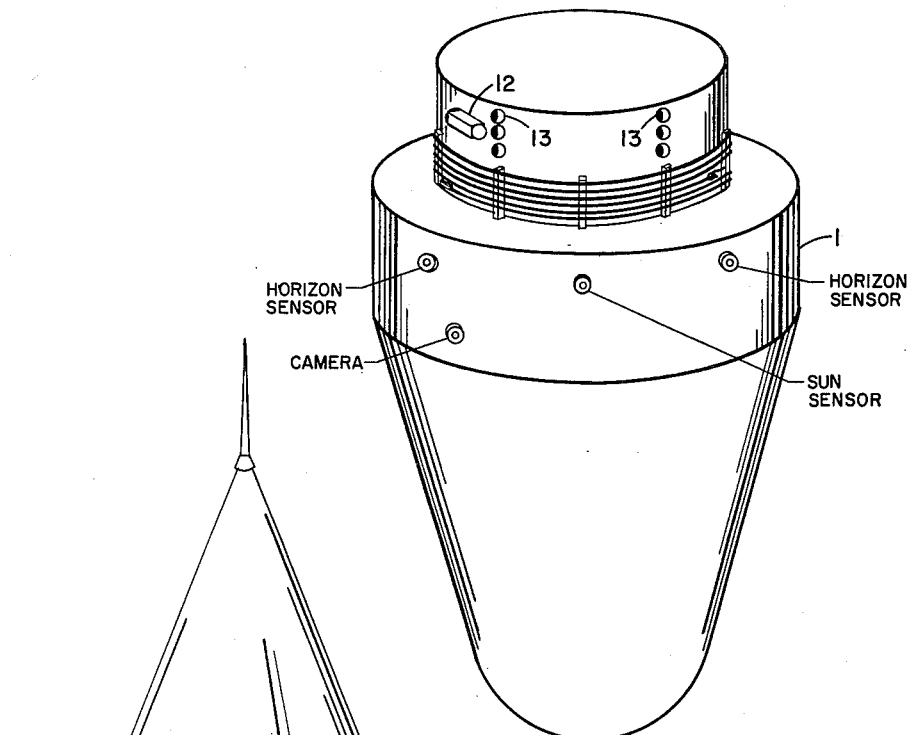
FIGURE 1 is a perspective view of one form of the invention.
Figure 5:
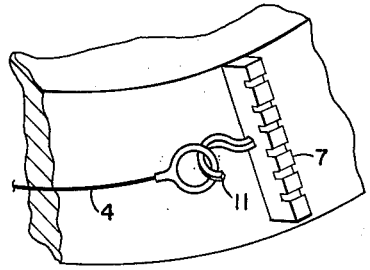
FIGURE 5 is a sectional view of the structure for temporarily fastening the wire of the form of FIGURE 1 to the shell.

In the form of FIGURE 1 two wires of equal lengths are shown, each having three turns around the satellite main body. The hooks by which the inboard ends of the unwinding wires are temporarily fastened to the shell are diametrically located. This location causes a balance of the torques of the taut wires on body 1, so that the wires are not necessarily close to the transverse plane of the vehicle thru its center of mass, whereas if only one wire and weight are used, as in FIGURE 7, the torque of the wire would change the attitude of the satellite unless the wire is in the transverse plane thru the vehicle's center of mass (CM). The hook, 11, may be mounted on one of the wire-holding brackets 7 as shown in FIGURE 5, with the weight-retaining slot and bolt located at some other bracket; or, as shown in FIGURE 6, both hook 11 and the metal element in which slot 8 is formed may be supported by a single, hollow bracket.

When the mass $m$ and the lengths of the wires of FIGURE 1 are such as to reduce the speed of body 1 to zero, jets from the attitude-controlling nozzles 12 may be utilized to cause an exact, desired rotary speed of 1. This exactness enables a greater degree of accuracy of the attitude control system, which comprises nozzles 13 (of known structural design). If on the other hand, mass $m$ and the wire lengths are designed to slow the angular velocity of body 1 to a few r.p.m. there may be a slight error in the resulting rotary speed. This error, however, would be less than if the rotary speed were slowed only by the use of jets from nozzles 12. This improvement is due to the fact that the reduction in angular speed of body 1 that is caused by the unwinding wires and weights comprises a division of the not-exactly-predictable, rotary speed of the satellite after its separation from the last propulsive stage; whereas any reduction of this post-separation speed by means of nozzles 12 is of a predetermined value, that is substracted from said speed.

In either, optional use of the space vehicle of FIGURE 1 each wire 4 completely unwinds from main body 1 and then at substantially its radial position is detached. The shallowness of hook 11 allows eye 14 to slide off the hook. The inside curve of the hook may be non-circular, as shown, to expedite this release.

In such division of the initial spinning error by the use of the form of FIGURE 1, it is obvious that diametrically-placed nozzles 12 may be eliminated.

Figure 2:
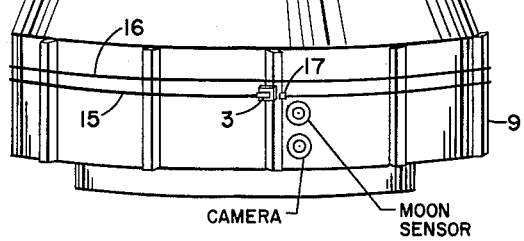
FIGURE 2 is an elevational view of a second form of the invention.
Figure 8:
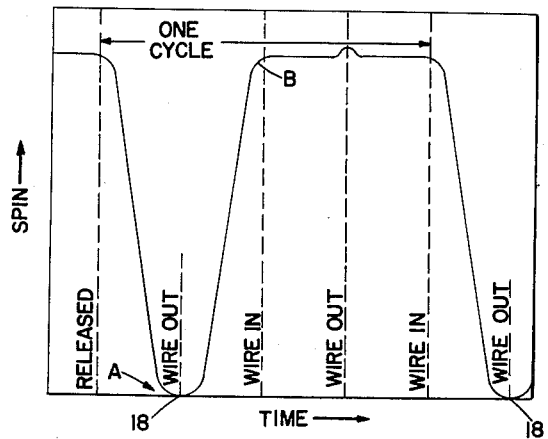
FIGURE 8 is a diagram illustrating one cycle of operation of the structure of FIGURE 2.

On the form of the invention shown in FIGURE 2, wires 15 and 16 are fixed to the satelite and are adapted to reduce the rotation of the vehicle to zero (or to a slight spin) by rewinding and unwinding on the shell. This in turn imparts to the satellite a cycle of spinning motion such as is indicated in FIGURE 8. One end of wire 15 is fixed to weight 3, which is releasably supported by an explosive bolt. The other end of wire 15 is fixed to the shell at 17. Similarly, wire 16 is fixed to a weight and to the shell at points that are diametrically opposite to weight 3 and shell connection 17 in FIGURE 2.

After the weights in this form of the invention are released from the surface of the shell, they unwind toward point A, as indicated in FIGURE 8; and at point 18 they cause the spin to stop. The wires then rewind, substantially restoring the original spin, and then unwind a second time. As indicated by the portion of the curve of FIGURE 8 that follows point B, this second unwinding is very different from the first. In it the weight leads the string, while moving approximately in a straight line; and its original velocity unwinds the wire without tension.

When the wire is completely unwound a small jerk of tension reverses its motion, and momentarily increases the satellite's spin. After the wire has rewound a second time, the initial conditions have been restored and the cycle begins again. This repetition of the spin cycle obviously may be used in various operations aboard the satellites, for example in scanning for attitude control, or in photography.

In FIGURE 2, a moon sensor and a camera are shown as located at, or closely adjacent to the point where the spin is reduced to zero. By means of the moon sensor and the pause in the satellite's spin a significant amount of light from the moon may be utilized in attitude control of the vehicle. At the same time, and optionally, the camera may be actuated to take a picture.

Figure 9:
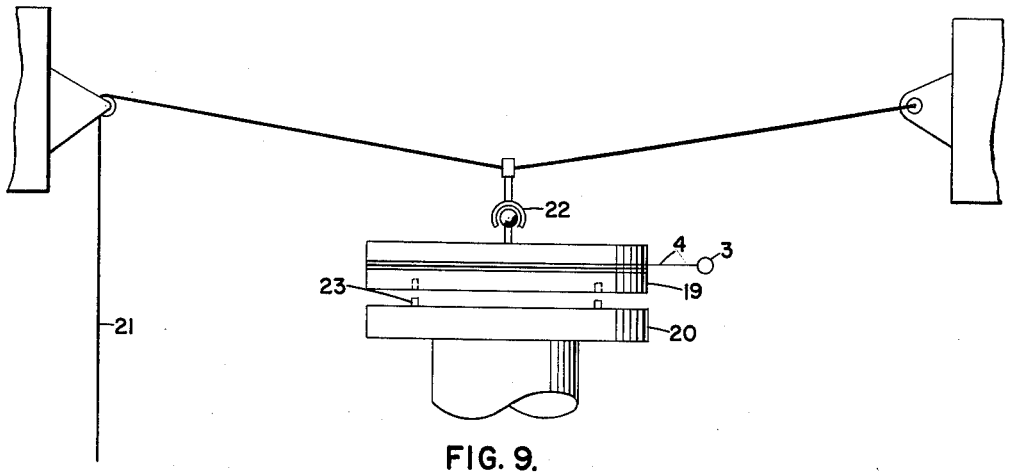
FIGURE 9 is a semi-schematic, elevational view of a simulated satellite, incorporating and illustrating the basic features of the invention.

A laboratory model of the spin-control system is shown in FIGURE 9. Element 19, which simulates a satellite or other space vehicle, and may support instruments to be tested, is set in rotation by turntable 20. Thereafter, rope or cable 21 is pulled downward by an operator, thus forcing universal joint 22 upward, and moving element 19 upward until its driving sockets are clear of pins 23. Then weight 3 is released so that it spirals away from the cylindrical periphery of rotating element 19.

Some examples of variations in the mass $m$ and the associated number of turns of wire that stop the post-separation spin of a satellite body 1 of a given mass M are indicated below:

| $M/m$ | $m$, lbs. | No. of Turns to Stop Spin | Maximum Tension in Wire, lbs. |
|---|---|---|---|
| 100 | 0.15 | 1.1 | 80 |
| 1,000 | 0.015 | 3.9 | 25 |
| 10,000 | 0.0015 | 12.6 | 8 |

The invention comprehends various obvious changes in structure from that herein illustrated, within the scope of the subjoined claims.

The following invention is claimed:

1. A space vehicle adapted to be propelled beyond the earth's atmosphere comprising: a main body having a shell and a longitudinal axis about which the main body is gyroscopically rotating as it enters space; auxiliary means having a mass that is much smaller than that of said main body for varying the rotation of said main body; at least one elongated flexible connnecting line wound around said shell; means for fastening one end of said line to said auxiliary means; means for attaching the other end of said line to said body, said attaching means being constructed and arranged to permit detachment of its associated line, when said line has unwound to the extent that it is substantially radially located relative to said axis; means for releasably connecting each of said auxiliary means to said body; and means secured to said body for effecting release of said releasable connecting means; whereby after release of said connecting means said auxiliary means move outward from said axis under centrifugal force, and said line unwinds from said shell.

2. A device as set forth in claim 1, in which said means for releasably connecting said auxiliary means to said body comprises an explodable element.

3. A device as set forth in claim 1, in which said auxiliary means comprises a plurality of weights.

4. A device as set forth in claim 3, which further comprises a plurality of lines connected between said auxiliary means and said body.

5. A device as set forth in claim 4, in which the ratio between the mass of said body and the mass of said auxiliary means and the lengths of said lines are constructed and arranged to completely stop the rotation of said body when said lines are detached from the body as well as producing any other desired spin from the original spin through zero spin.

6. A device as set forth in claim 5, which further comprises jet motors constructed and arranged for rotating said body about said axis, after the rotary speed of said body is reduced to zero.

7. A device as set forth in claim 1 in which said attaching means comprises an eye on an end of said line and a hook constructed and arranged to permit said eye and its associated line to be detached from said hook when said line has unwound into a substantially radial position relative to said axis.

8. A device as set forth in claim 4 in which each of said attaching means holds an end of one of said lines fixed to said body in all unwinding positions of said line; whereby said auxiliary means and lines function in a repeated cycle that comprises unwinding of the lines, rewinding of the lines, a second unwinding and a second rewinding of the lines, thus momentarily stopping the spin of said body at a point in each cycle, due to temporary absorption of the initial angular momentum of said body in increased angular momentum of said auxiliary means.

9. A device as set forth in claim 8, which further comprises a light sensor located adjacent one of said attaching means and a camera located adjacent one of said attaching means.

References Cited in the file of this patent

UNITED STATES PATENTS 1,488,182    Whelton _____ Mar. 25, 1924

OTHER REFERENCES

Aircraft and Missiles Manufacturing Magazine, Philadelphia, April 1959, volume 2, No. 4, pages 66 and 67.